J. A. H. HATT.
COLOR FILTER NEGATIVE AND THE PROCESS OF PREPARING SAME.
APPLICATION FILED DEC. 28, 1918.

1,349,956. Patented Aug. 17, 1920.

Fig. 1.
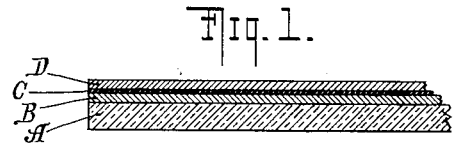

Fig. 2.
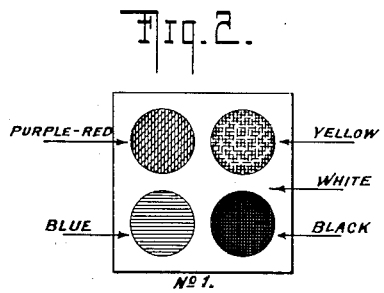
PURPLE-RED — YELLOW
— WHITE
BLUE — BLACK
Nº 1.

Fig. 3.

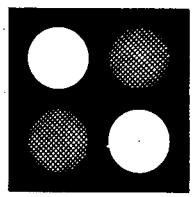
PHOTOGRAPHED THROUGH GREEN COLOR FILTER FOR PURPLE RED PLATE.
Nº 2.

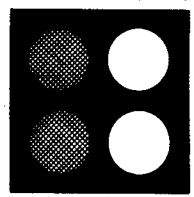
THROUGH VIOLET COLOR FILTER FOR YELLOW PLATE.
Nº 3.

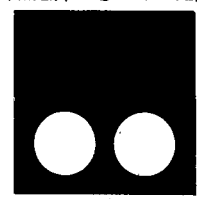
THROUGH RED COLOR FILTER FOR BLUE PLATE.
Nº 4.

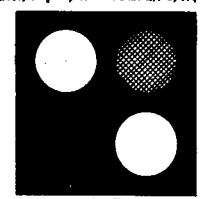
AS CORRECTED WHEN RECEIVING CORRECTING IMAGE FROM Nº 4. THE BLACK ON Nº 4 HAVING BEEN OPAQUED OUT.
Nº 5.

Fig. 4.

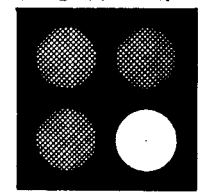
THROUGH YELLOW FILTER FOR BLACK PLATE.
Nº 6.

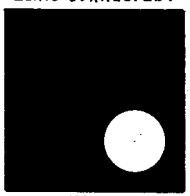
SAME AS Nº 6 AFTER BEING CORRECTED.
Nº 7.

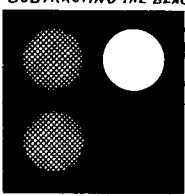
SAME AS Nº 3 AFTER SUBTRACTING THE BLACK.
Nº 8.

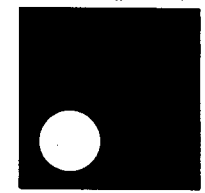
SAME AS Nº 4 AFTER SUBTRACTING THE BLACK.
Nº 9.

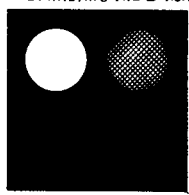
SAME AS Nº 5 AFTER SUBTRACTING THE BLACK.
Nº 10.

Witnesses
G. V. Rasmussen

Inventor
JOSEPH A. H. HATT
by
his Attorneys

UNITED STATES PATENT OFFICE.

JOSEPH ARTHUR HENRY HATT, OF BROOKLYN, NEW YORK.

COLOR-FILTER NEGATIVE AND THE PROCESS OF PREPARING SAME.

1,349,956.  Specification of Letters Patent.  Patented Aug. 17, 1920.

Application filed December 28, 1918. Serial No. 268,617.

*To all whom it may concern:*

Be it known that I, JOSEPH ARTHUR HENRY HATT, a citizen of the United States, and a resident of the borough of Brooklyn, county of Kings, city and State of New York, have invented a new Color-Filter Negative and the Process of Preparing Same, of which the following is a specification.

The invention relates to the art of printing in colors and more particularly to the preparation of the color plates by photo-mechanical processes. The object of the invention is to correct unsatisfactory color filter negatives in a mechanical way whereby better printing results are obtained while the necessity of hand work is substantially eliminated.

I have illustrated my process and the resensitized plate in the accompanying drawings, in which Figure 1 represents a section through a negative prepared in accordance with my invention; Fig. 2 represents the chart or picture from which the negatives are prepared; Fig. 3 represents diagrammatically the correction of the purple-red plate for three color work, while Fig. 4 represents diagrammatically corrections taking place in connection with the subtraction of black in four color process work."

The usual processes of color printing wherein relief photo-mechanical plates are used, are known respectively as the three color process or the four color process. In the three color process the three primary colors alone are used, while in the four color process an additional black plate is employed. Three and four color process negatives may also be used for making color plates where a larger amount of color printing plates are used, especially in planograph color printing, the same negative being used for one or more plates.

For the purpose of describing the invention, it will be set forth at length in connection with its use in the three color process. In that process each of the three negatives is produced by photographing the picture to be reproduced through a color filter suitable for the color selection which is desired. The plates used for such negatives are known as color sensitive plates under various trade names. The preparation and handling of such plates represents common practice and is well known in the art. For example, the blue printing plate is generally made through a red color filter and a fairly accurate result is obtained from a negative thus prepared, the negative showing the proper values of the blue in all of its combinations and the proper values of the black as well. The negative for the yellow printing plate, made through a violet color filter, is also quite satisfactory although not as accurate as the blue negative. Comparatively little correction is needed for the yellow plate and such as is required is generally done by hand. The negative for the purple-red printing plate, on the other hand, which is made through a green color filter, is quite incorrect in certain parts. The reds, oranges, yellows and blacks represented in the purple-red negative are fairly correct, but those parts which represent the blues and greens are quite faulty, being considerably lacking in density at those portions. To meet this difficulty it is generally necessary to correct those portions which represent the blues and greens on the purple-red printing plate by hand methods, which are expensive and unsatisfactory.

It is the object of this invention to supersede these known methods of correcting plates and to replace them by a method which is cheap, efficient and produces infinitely better results. My invention is carried out as follows, and while described in connection with the three color process it obviously applies to other processes, having in view the production of a half tone printing surface, either relief, planographic or intaglio. In the three color process I prepare the usual three negatives in the usual manner from a chart or picture of which Fig. 2 illustrates a typical specimen. When the negatives are developed, fixed and dried, the purple-ed (green filter) negative is resensitized as a wet plate by coating it with negative collodion and then immersing it in a silver nitrate bath in the same well known manner that is employed in preparing wet plates. Before applying this new sensitized surface, I prefer to coat the purple-red negative with a thin rubber solution, such as is used by photo-engravers generally for stripping purposes, or any other suitable mediums, in order to protect the negative from being stained or spoiled by the solutions and treatment subsequently applied. When this rubber coating is dried sufficiently the second sensitized photographic surface is applied thereto, the rubber being present as an extremely thin, transparent, protecting sheet interposed between the two photographic surfaces of the negative of which, as already explained, the lower surface is a fully developed, photographic surface. The plate thus produced is shown in section in Fig. 1 of the drawings in which A represents the glass plate or foundation, B the developed negative made by photographing the original picture through a green color filter, C a film of transparent rubber and D a new photographically sensitive surface.

The plate with its added sensitized surface is then placed in the holder of a camera, which is adapted to carry at the other end the negative for the blue printing plate. The camera should be arranged and set up in such a way that the blue plate can be placed in exact registry, with respect to design, with the developed purple-red plate. A camera suitable for this purpose may be made by using a central lens with a fixed focus and arranging a plate holder at equal distances from said lens, one of the plate holders being provided with adjusting mechanism, preferably screw controlled, to allow the plate in said holder to be brought in exact and precise registry with the plate in the opposite holder. When the purple-red resensitized plate is inserted in such a camera and positioned therein so that the image of the blue negative will exactly coincide with the image on the purple-red negative, an exposure is made. Prior to such exposure it is advisable to opaque the blue negative on the back thereof so as to prevent any light action except on the parts where correction is needed. At those parts where the purple-red negative requires most correction, the blue negative is found to be the complementary of the purple-red negative. In other words, the blue negative would make a good positive of the purple-red negative in those parts thereof which represent the blues and greens of the original picture. During the exposure the blue negative is properly illuminated by any suitable method.

After the exposure the purple-red plate is taken to the dark room and developed. Owing to the fact that the wet plate is developed and manipulated in a comparatively bright yellow light, it is fairly easy to judge the amount of development so that the development can be regulated with the greatest nicety to carry it just far enough to make the required correction in the negative. The purple-red negative, when thus corrected, should show just as perfect a color rendering for the purple-red as the negative for the blue does for the blue. The course of the procedure as involved in the three color process is illustrated in Fig. 3 of the drawing.

When making four color negatives, the black plate is usually made through a yellow color filter on what is known to the trade as a panchromatic plate although obviously other methods may be employed. This negative, when thus made, is incorrect inasmuch as the color values, with the exception of the yellow, are not dense enough and require reinforcing. According to my process this is accomplished by resensitizing the negative for the black in the same manner as explained for the purple-red negative. It is then placed in the camera and given a small exposure through the purple-red negative and through the blue negative, and a small exposure may also be given through the yellow negative if it is found necessary. When properly exposed and developed, this negative should give a correct rendering of the blacks in the picture and is ready for use in making a half tone negative or half tone positive, as the case may be, to be used in making a printing plate in any of the methods which are well known in the art. The course of the procedure as involved in the four color process is illustrated in Fig. 4 of the drawings.

It will be observed that in making a set of three color negatives, the negatives in each case have a record of the black in the picture in addition to the various colors which they represent. This is a necessary requirement of the three color process since it takes the combination of the three colors, when superposed, to produce black. In four color work, however, where the black is printed as an independent plate, the black parts in the color negatives are not only unnecessary but undesirable. According to my invention, it will be observed that I proceed by a method of subtraction of the undesirable black color in the color negatives. Each of the color negatives, yellow, blue and purple-red, is resensitized, as above explained, and an exposure is made on them through the corrected black negative which thus removes, when developed, the excess black value from each of the color negatives.

My process will thus enable negatives to be corrected until they truly represent just the proper proportion of each color required in the picture, as well as the proper amount of black.

So far as I am aware, I am the first to photograph a corrective image over and to form part of a previously exposed and developed image.

What I claim is:

1. The process which consists in preparing a photographic negative from a picture by exposure through a certain color filter, developing the plate so produced and superposing above said developed surface a new photographically sensitive surface, placing the design of the first layer in exact photographic registry with the image of a negative made from the original picture but through a different color filter, then making an exposure, and then developing and fixing the image in said new sensitive surface whereby a corrected color separation negative suitable for transfer to a printing plate is obtained.

2. The process which consists in preparing a photographic negative from the picture by exposure through a certain color filter, developing the plate so produced and applying a protective layer to said developed image, forming thereon a new photographically sensitive surface, placing the design of the first layer in exact photographic registry with the image of a negative made from the original picture but through a different color filter, then making an exposure, and then developing and fixing the image in said new sensitive surface whereby a corrected color separation negative suitable for transfer to a printing plate is obtained.

3. The process which consists in preparing a photographic negative from a picture by exposure through a certain color filter, developing the plate so produced and superposing above said developed surface a new photographically sensitive surface, placing the design of the first layer in exact photographic registry with the image of a negative made from the original picture but through a different color filter, making an exposure and then successively placing the design of the first layer in registry with the image of other negatives made through different color filters and making successive exposures, and then developing and fixing the image in said new sensitive surface whereby a corrected color separation negative suitable for transfer to a printing plate is obtained.

4. In the art of preparing printing plates that improvement which consists in preparing a plurality of negatives comprising photographically developed images from the same object, preparing a corrective negative from one of said negatives on a photographically sensitive surface, developing the same, and then preparing a combined design of the developed corrective negative and one of the original negatives other than the one from which the corrective plate was prepared.

5. In the art of preparing printing plates that improvement which consists in preparing a plurality of negatives comprising photographically developed images from the same object, applying a photographically sensitive surface above that of the developed image on one of said plates, preparing a corrective negative from another of said negatives on said photographically sensitive surface, developing the same, and then preparing a combined design of the developed corrective negative and of the developed image beneath the same.

6. In the art of preparing printing plates that improvement which consists in preparing a plurality of negatives comprising photographically developed images from the same object, preparing a corrective negative from a plurality of said negatives on a photographically sensitive surface, developing the same, and then preparing a combined design of the developed corrective negative and one of the original negatives other than the ones from which the corrective plate was prepared.

7. In the art of preparing printing plates that improvement which consists in preparing a plurality of negatives comprising photographically developed images from the same object, applying a photographically sensitive surface above that of the developed image on one of said plates, preparing on said surface a corrective negative from a plurality of the original negatives other than that carrying the said sensitive surface, developing the same, and then preparing a combined design of the developed corrective negative and of the developed image beneath the same.

8. A color filter negative for use in lithography comprising a transparent foundation and upon said foundation a developed photographic image composed only of uncolored relatively transparent and opaque portions and lacking a selected color value, and above said image a further developed photographic image of the same character but lacking a different color value in registry with that of the image beneath and developed independently thereof.

9. A color filter negative for use in lithography comprising a transparent foundation and upon said foundation a developed photographic image composed only of uncolored relatively transparent and opaque portions and lacking a selected color value and above said image a further developed photographic image of the same character but lacking a different color value in registry with that of the image beneath and developed independently thereof, and an inert layer of transparent protective material between the layers of the two images.

In testimony whereof I have hereunto set my hand.

JOSEPH ARTHUR HENRY HATT.